Feb. 18, 1958 R. H. COLLINS 2,823,603
BALER
Filed Nov. 1, 1954 2 Sheets-Sheet 1
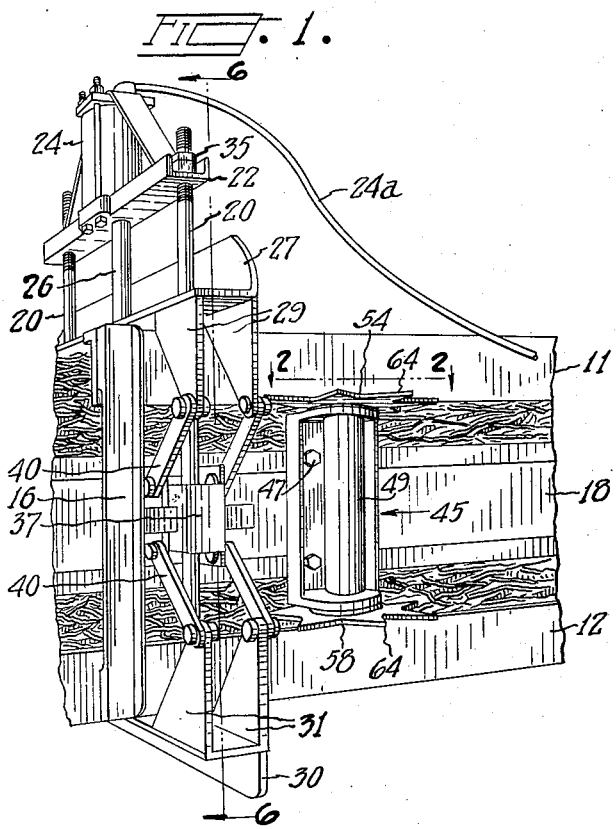
FIG. 1.
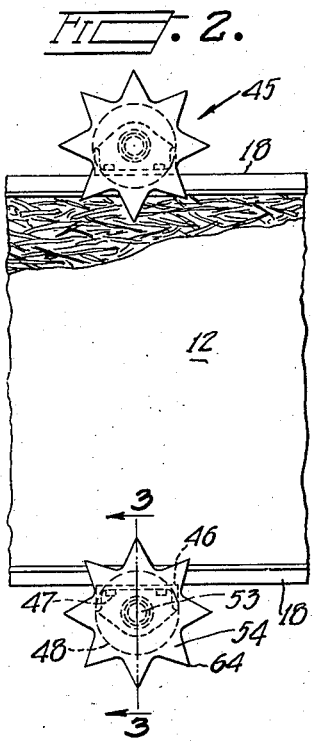
FIG. 2.
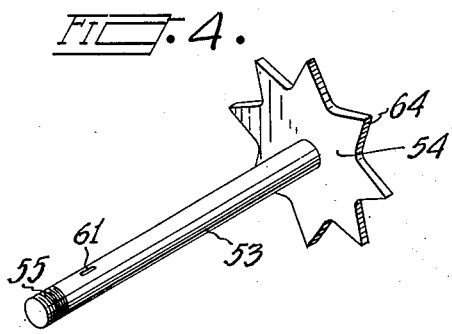
FIG. 4.
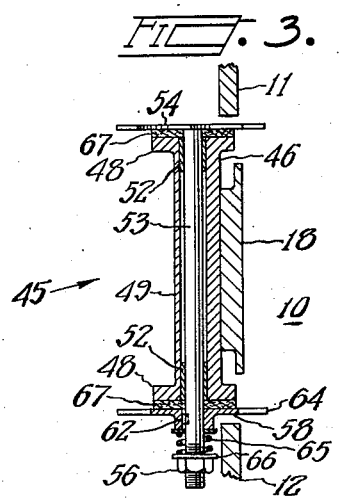
FIG. 3.
FIG. 5.
INVENTOR
ROBERT H. COLLINS
BY
Cook and Schermerhorn
ATTORNEYS Feb. 18, 1958 R. H. COLLINS 2,823,603
BALER
Filed Nov. 1, 1954 2 Sheets-Sheet 2
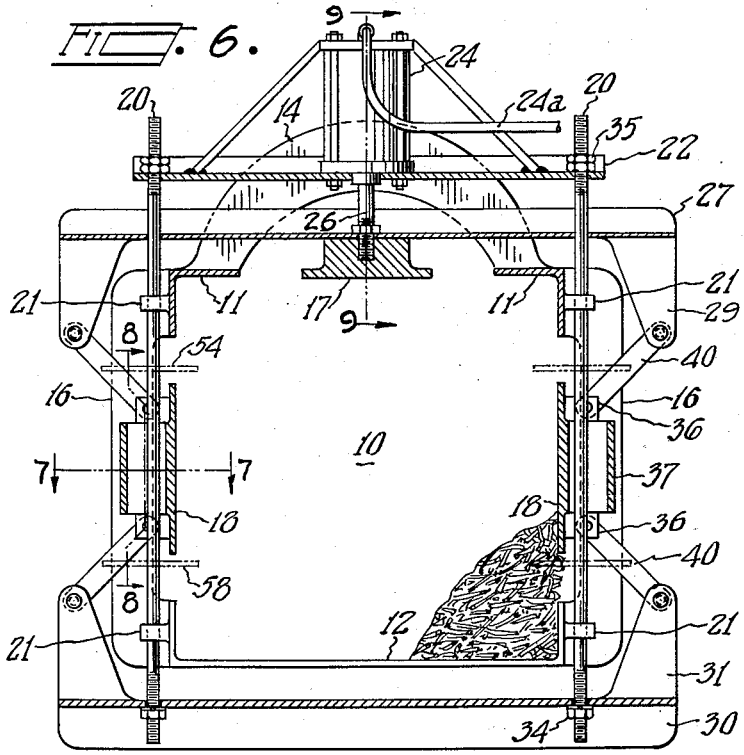
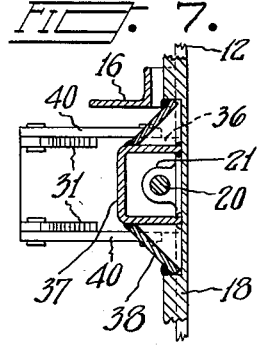
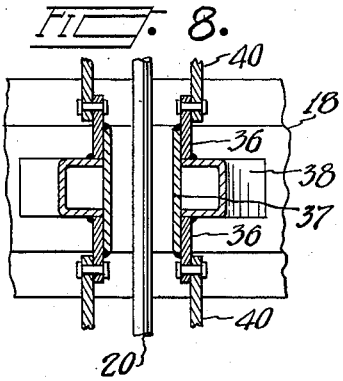
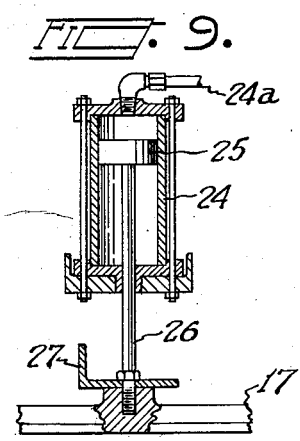
INVENTOR
ROBERT H. COLLINS
BY
Cook and Schermerhorn
ATTORNEYS

United States Patent Office 2,823,603
Patented Feb. 18, 1958

2,823,603

BALER

Robert H. Collins, Brownsville, Oreg.

Application November 1, 1954, Serial No. 466,025

2 Claims. (Cl. 100—179)

This invention relates to improvements in balers, and more specifically relates to attachment for a hay baler and the like for equalizing or uniformly distributing the density of material in a bale.

As is well known, balers for hay and the like employ a bale chamber to which the material is forcibly fed by a reciprocating plunger, generally actuated by a motor or the power take-off from a tractor. The bales are tied by wire or twine while in compacted condition in the machine, and when discharged from the machine expand against the wire tied therearound. If the density of the bale is not distributed substantially equally, the bale will buckle and the wire may slip off to release the material. Such conditions are very unsatisfactory and necessitate additional work in rebaling the material or in subsequent handling thereof.

The non-uniform density of the bales may be caused by a number of reasons. For example, the reciprocating plunger which moves the material through the bale chamber may not compress the material with uniform density due to an off-center position of said plunger in the bale chamber. Also, the material may be fed unevenly to the feed opening and be moved through the bale chamber with an unequal density. Furthermore, frictional resistance of the walls of the bale chamber may vary relative to each other to retard the movement of the material along certain surfaces of the bale chamber.

An object of the invention, therefore, is to provide an attachment which is readily secured to a baler for uniformly distributing the density of the material in the bale as said bale is being compressed.

An additional object is to provide a density controlling or distributing device which employs spaced, frictionally retarded members rotatable as a unit and having projecting portions disposed in the path of the material being baled.

Further objects are to provide a density controlling device which is simple in structure and reliable in operation, and which is inexpensive to manufacture.

In general, the present invention resides in an attachment which is bolted to the sides of a baler and which has spaced upper and lower rotatable members having projections disposed in the path of the material being baled. Frictional retarding means are provided for the rotatable members, and adjustment means are provided therefor to vary the amount of retarding force applied. The invention will be more fully described and additional objects and advantages will become apparent as such description proceeds in connection with the accompanying drawings. Various changes may be made in the construction and arrangement of parts within the scope of the appended claims without departing from the spirit of the invention.

In the drawings:

Figure 1 is a fragmentary perspective view of a baling machine with the present density controlling device attached thereto;

Figure 2 is a fragmentary top plan view of a portion of the baling chamber showing the attachments on each side thereof;

Figure 3 is a sectional view taken on the line 3—3 of Figure 2, and showing the internal structure of the attachment;

Figure 4 is a perspective view of one of the upper rotatable members and integral shaft;

Figure 5 is a perspective view of the lower rotatable member;

Figure 6 is a sectional view taken on the line 6—6 of Figure 1 and showing in detail the structure of a bale chamber of a conventional baling machine;

Figure 7 is a sectional view taken on the line 7—7 of Figure 6;

Figure 8 is a sectional view taken on the line 8—8 of Figure 6; and

Figure 9 is a sectional view taken on the line 9—9 of Figure 6.

Referring now in detail to the drawings, one type of baler structure to which the present invention may be applied comprises a bale chamber 10, Figure 6, comprising longitudinal top frame members 11 in the form of angle irons and a frame member 12 in the form of a channel iron comprising the bottom wall on which the material slides. These frame members are held in rigid position by a top transverse frame member 14 and vertical members 16 secured between frame members 11 and 13. The bale chamber 10 is further defined by a pressure plate 17, located at the top of the chamber between the two corner frame members 11, and a pair of pressure plates 18 located at each side between the upper and lower frame members 11 and 13. The feed opening of the baler, not shown, is disposed at the right in Figure 1, the plates 17 and 18 are pivotally mounted at some point adjacent the feed opening, the plate 17 being pivoted on a horizontal axis and plates 18 being pivoted on vertical axes.

A pair of rods 20 threaded on each end are slidably mounted in ears 21 secured to the longitudinal frame members 11 and 12, and slidably mounted on these rods above the bale chamber 10 is a transverse channel iron 22 comprising a base support for an hydraulic cylinder 24 having a piston 25 and piston rod 26 secured to the pressure plate 17, the cylinder 24 receiving fluid pressure through feed line 24a. Also secured to the piston rod 26 and movable vertically therewith is a transverse angle bar 27 having a pair of downwardly projecting ears 29 on each end thereof. Slidably mounted on the rods 20 beneath the bale chamber is a second transverse angle bar 30, this angle bar having a pair of upwardly projecting ears 31 on each end. Bars 27 and 30 are movable toward each other on the rods 20, and the bar 30 is supported on the rods 20 by nuts 34 threaded on the bottom ends of the rods 20. Rods 20 also have nuts 35 threaded on the top ends thereof which are engageable with the bar 22.

Secured to each of the pressure plates 18 are four lugs 36 and reinforcing channel members 37 and 38. Pivotally connected between the ears 29 and 31 on the angle bars 27 and 30, respectively, and the lugs 36 are links 40 which form a toggle mechanism. When fluid pressure is admitted to the cylinder 24, piston 25 is actuated to move the piston rod 26 and transverse bar 27 downwardly to position whereby pressure plate 17 engages the material in the baling chamber. Upon engagement of plate 17 with the material in the chamber 10, further actuation of the piston by fluid pressure causes the cylinder 24 and its base 22 to move upwardly on the rods 20 and to continue such movement until the base 22 engages nuts 35. Thereupon, base 22 exerts an upward force on the nuts 35 to move the rods 20 and angle bar 30 upwardly and the toggle mechanism pivots the plates 18 inwardly to compress material in the chamber 10 from the sides. By this type of baling structure the material to be baled, which is forced through the baling chamber 10 by means of a horizontally reciprocating plunger, not shown, is compressed both from the top and sides for forming a tight bale.

Referring now in particular to Figures 1-5, there is shown a density equalizing device 45 for use on balers of the type hereinbefore described, although it is to be understood that the device may be applied to other types of balers. The device comprises a channel shaped support or bracket 46 which is adapted to be bolted to the pressure plates 18 by bolts 47. Support 46 has projecting end portions 48 between which is mounted or cast a cylindrical housing 49. Rotatably journaled in the housing 49 by bearings 52 is a shaft 53. The shaft 53 has an integral wheel or disc 54 rigidly secured on one end and has screw threads 55 on the opposite end for receiving a nut 56. Removably mounted on the other end of the shaft from the wheel 54 is a wheel or disc 58 having a projecting hub 59 provided with a keyway 60. Shaft 53 has a slot 61 for receiving a key 62 which also engages keyway 60 of the wheel 58 when the wheel is mounted on the shaft to prevent relative rotation of the parts. The wheels or discs 54 and 58 have projections 64 which partially extend into the bale chamber 10 when the device is mounted on the baler. Projections 64 may take any desired shape but, as shown herein, a preferred construction is to cast the discs 54 and 58 in the form of star wheels.

A compression spring 65 is loosely mounted on the shaft between a pair of washers 66 which engage the nut 56 and the hub 59. Mounted on the shaft 53 adjacent the inner surface of each disc is a friction ring or brake lining 67 which is adapted frictionally to resist rotation of the discs and shaft. The braking action of the linings can be increased or decreased by tightening or loosening the nut 56.

In operation of the baler, the material to be baled is moved through the bale chamber 10 by the reciprocating plunger. The projections 64 on the retarding discs 54 and 58 extend into the baling chamber and are engaged by the moving material to cause rotation of the retarding discs and the shafts 53, the retarding action on the discs being accomplished by the friction lining 67 and the amount of retarding action being variable by adjustment of nuts 56 on the shafts 53.

The retarding devices serve the function of equalizing the density of the material throughout the bale. If, for example, the material is being compacted more tightly at the bottom of the chamber than at the top, the retarding force of the bottom discs restrain movement of the material in that area until additional material is moved into and packed at the top to a density substantially equal to that at the bottom. This feature is accomplished by the fact that the material will shift to the area offering the least resistance of passage, and when the upper and lower areas are of substantially uniform density, the material in such areas moves at an equal rate until, of course, such time as another void or soft spot appears therein.

More importantly, if the material is being compacted with greater density on one side of the chamber than on the other, the retarding force imparted by the upper and lower discs of one of the units 45 will restrain movement of the material on the said one side until material is compacted to an equal density on the other side.

It is apparent, therfore, that if a void or soft spot occurs in the material in any area in the chamber 10, the remaining area will be restrained until the void or soft spot is filled to uniform density. Adjustment may have to be made for different types of material being baled because one type of material may move through the chamber with voids in different areas than others, but after experimentation and adjustment of the two units relative to each other on the first bale or two the remainder of the material in that particular field is assuredly packed in bales of uniform density.

Having now described my invention and in what manner the same may be used, what I claim as new and desire to protect by Letters Patent is:

1. In a baling machine having a baling chamber defined by upper and lower walls and a pair of laterally movable side plates, a vertically disposed channel-shaped bracket fixed to each of said side plates, said brackets having top and bottom flat surfaces, a vertical shaft journaled in each of said brackets and projecting beyond said top and bottom flat surfaces, said shafts being independently rotatable, a pair of disc members fixed to the upper and lower projecting portions of each of said shafts, radial extensions on said disc members extending into said baling chamber in the path of material passing therethrough, frictional lining between said disc members and said top and bottom flat surfaces for applying a frictional retarding force to said disc members, said disc members being disposed adjacent the upper and lower portions only of said baling chamber for forming retarding means for material in said baling chamber at the upper and lower side portions for distributing said material with equal density vertically and laterally as it moves through said baling chamber in engagement with said disc members, and adjustable screw threaded means on said shaft arranged to apply resilient compressive force on said frictional lining between said disc members and said top and bottom surfaces for varying said retarding force.

2. In a baling machine having a baling chamber defined by upper and lower walls and a pair of laterally movable side plates, a rigid bracket fixed to each of said side plates and having vertically spaced top and bottom flat surfaces, a vertical shaft journaled in each of said brackets and projecting beyond said top and bottom flat surfaces, said shafts being independently rotatable, a disc member integrally connected with the upper end of each of said shafts, friction lining between said disc member and said flat top surface of said bracket, a disc member slidably keyed to the lower end of each shaft for rotation with the shaft and longitudinal slidable movement on said shaft, friction lining between said lower disc member and said bottom flat surface of said bracket, radial extensions on said disc members extending into said baling chamber in the path of material passing therethrough, said disc members being disposed adjacent the upper and lower portions only of both sides of said baling chamber to form equalizing retarding means for re-distributing said material with equal density both vertically and laterally as it moves through said baling chamber in engagement with said disc members, a coil spring on the lower end of each said shaft bearing against said lower disc member, and a nut on the lower end of said shaft bearing against said spring to apply adjustable resilient compressive force against both of said frictional linings for varying the retarding force exerted by said disc members.

References Cited in the file of this patent
UNITED STATES PATENTS

| 375,078 | Livengood | Dec. 20, 1887 |
| 2,528,538 | Nolt | Nov. 7, 1950 |
| 2,686,467 | Nolt | Aug. 17, 1954 |
| 2,704,508 | Hansen | Mar. 22, 1955 |

FOREIGN PATENTS

| 1,054,522 | France | Oct. 7, 1953 |